(12) United States Patent
Bublitz et al.

(10) Patent No.: US 10,710,257 B2
(45) Date of Patent: Jul. 14, 2020

(54) POWER TOOL, SUCH AS A METAL SHEARS

(71) Applicant: MILWAUKEE ELECTRIC TOOL CORPORATION, Brookfield, WI (US)

(72) Inventors: Scott D. Bublitz, Hartland, WI (US); Scott D. Eisenhardt, Milwaukee, WI (US); Hongping Hui, Dongguan (CN); Andrew M. Plowman, Wauwatosa, WI (US); Michael Steele, Pewaukee, WI (US); Guojian Yang, Dongguan (CN)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 141 days.

(21) Appl. No.: 15/690,496

(22) Filed: Aug. 30, 2017

(65) Prior Publication Data

US 2017/0361475 A1 Dec. 21, 2017

Related U.S. Application Data

(62) Division of application No. 14/781,689, filed as application No. PCT/CN2013/081368 on Aug. 13, 2013, now Pat. No. 9,764,486.

(Continued)

(51) Int. Cl.
*B26B 15/00* (2006.01)
*B23D 29/00* (2006.01)
*B25F 5/02* (2006.01)

(52) U.S. Cl.
CPC ............ *B26B 15/00* (2013.01); *B23D 29/005* (2013.01); *B25F 5/02* (2013.01)

(58) Field of Classification Search
CPC ...... A01G 3/033; A01G 3/047; A01G 3/0475; A01G 3/053; A01G 3/067; B26B 15/00;

(Continued)

(56) References Cited

U.S. PATENT DOCUMENTS

| 511,125 A | 12/1893 | Cochran |
| 511,966 A | 1/1894 | Olsen |

(Continued)

FOREIGN PATENT DOCUMENTS

| CN | 1792566 | 6/2006 |
| CN | 1970239 | 5/2007 |

(Continued)

OTHER PUBLICATIONS

Panasonic EY4640X RevoLithium 14.4 Volt Li-ion Angle Grinder (Bare Tool), Available Online at: <http://www.toolbarn.com/product/panasonic/EY4640X/>, Available at least as early as Dec. 8, 2008.

(Continued)

*Primary Examiner* — Jason Daniel Prone
(74) *Attorney, Agent, or Firm* — Michael Best & Friedrich LLP

(57) ABSTRACT

A power tool includes a housing having a first portion defining a forward end of the housing, a second portion defining a rearward end of the housing, an upper surface extending rearwardly from the forward end, and a lower surface extending forwardly from the rearward end. The power tool also includes a motor positioned within the housing, a drive mechanism coupled to the motor and positioned within the housing, an output element coupled to the drive mechanism at the forward end of the housing, a battery pack supported at the rearward end of the housing and electrically coupled to the motor, and an actuator operable to selectively power the motor to drive the drive mechanism and the output element. The actuator is supported by the housing forward of and above the battery pack.

7 Claims, 10 Drawing Sheets

Related U.S. Application Data

(60) Provisional application No. 61/808,342, filed on Apr. 4, 2013.

(58) Field of Classification Search
CPC ....... B26B 19/02; B26B 19/04; B26B 19/044; B26B 19/048; B26B 19/146; B26B 19/28; B26B 19/282; B26B 19/3886; B23D 29/005; B25F 5/02
USPC .......................... 30/199–211, 228; D8/67–69
See application file for complete search history.

(56) References Cited

U.S. PATENT DOCUMENTS

| | | |
|---|---|---|
| 873,333 A | 12/1907 | Sweet |
| 1,359,031 A | 11/1920 | Coffman |
| 1,765,313 A | 6/1930 | Steindorff et al. |
| 1,839,009 A | 12/1931 | Bankson |
| 1,937,586 A | 12/1933 | Ortt |
| 2,020,242 A | 11/1935 | Geddes |
| 2,222,317 A | 11/1940 | Martin |
| 2,567,129 A | 9/1951 | Shoffner |
| 2,635,335 A | 4/1953 | James |
| 2,642,658 A | 6/1953 | Johnson |
| 2,653,381 A | 9/1953 | Rooke |
| 2,818,643 A | 1/1958 | Dawson |
| 3,052,980 A | 9/1962 | Fieser |
| D197,987 S * | 4/1964 | Docken ............ D8/68 |
| 3,157,948 A | 11/1964 | Schwartz |
| 3,178,816 A | 4/1965 | Schmid |
| 3,189,997 A | 6/1965 | Mount |
| 3,217,409 A | 11/1965 | Proffitt |
| 3,430,521 A | 3/1969 | Kulman |
| 3,585,719 A | 6/1971 | Kivela |
| 3,596,355 A | 8/1971 | Wertepny |
| 3,601,894 A | 8/1971 | Baturay |
| 3,710,445 A | 1/1973 | Roth |
| 3,876,015 A | 4/1975 | Kivela |
| 3,999,110 A | 12/1976 | Ramstrom et al. |
| 4,173,069 A | 11/1979 | Sidenstick |
| D275,445 S * | 9/1984 | Totsu ............... D8/68 |
| D275,728 S * | 10/1984 | Totsu ............... D8/68 |
| 4,597,227 A | 7/1986 | Gentischer et al. |
| 4,625,462 A | 12/1986 | Fushiya et al. |
| 4,669,190 A | 6/1987 | Innami et al. |
| 4,682,416 A | 7/1987 | Stolfa |
| 4,688,329 A | 8/1987 | Oord |
| D295,824 S | 5/1988 | Hoshino et al. |
| D296,072 S * | 6/1988 | Mochida ............ D8/68 |
| D296,655 S * | 7/1988 | Yonezawa .......... D8/68 |
| D298,207 S * | 10/1988 | Kilmer ............... D8/68 |
| 4,827,616 A | 5/1989 | Sistare |
| D302,646 S * | 8/1989 | Sasaki ............... D8/68 |
| 4,880,015 A | 11/1989 | Nierman |
| 4,903,408 A | 2/1990 | Tagawa et al. |
| 5,020,281 A | 6/1991 | Neff |
| 5,054,202 A | 10/1991 | Takigawa |
| D324,801 S * | 3/1992 | Caskey ............. D8/68 |
| 5,165,172 A | 11/1992 | Weinrauch |
| 5,172,479 A | 12/1992 | Keeton |
| D333,080 S * | 2/1993 | Fushiya ............ D8/68 |
| D347,153 S | 5/1994 | Uneyama |
| D351,772 S | 10/1994 | Price |
| 5,566,454 A | 10/1996 | Eisenbraun |
| 5,606,799 A | 3/1997 | Melton |
| 5,642,566 A | 7/1997 | Hirabayashi |
| 5,832,611 A | 11/1998 | Schmitz |
| D404,627 S * | 1/1999 | Hirabayashi ...... D8/68 |
| 5,901,447 A | 5/1999 | Dunning |
| 5,992,024 A | 11/1999 | Rogers |
| 5,993,303 A | 11/1999 | Fladgard et al. |
| D420,877 S * | 2/2000 | Schultz ............. D8/68 |
| 6,057,608 A | 5/2000 | Bailey, Jr. et al. |
| 6,178,643 B1 | 1/2001 | Erbrick et al. |
| D447,036 S * | 8/2001 | Netzler ............. D8/69 |
| 6,304,058 B2 | 10/2001 | Watson et al. |
| 6,311,583 B1 | 11/2001 | Izumisawa |
| 6,329,788 B1 | 12/2001 | Bailey, Jr. et al. |
| 6,446,734 B1 | 9/2002 | Williams et al. |
| 6,502,312 B2 | 1/2003 | Beutel et al. |
| 6,515,451 B2 | 2/2003 | Watson et al. |
| 6,536,116 B2 | 3/2003 | Fung |
| 6,562,509 B1 | 5/2003 | Eggert |
| 6,653,815 B2 | 11/2003 | Watson et al. |
| 6,568,089 B1 | 12/2003 | Mohr et al. |
| 6,658,089 B1 | 12/2003 | Mohr et al. |
| 6,662,451 B1 | 12/2003 | Cheng |
| 6,671,969 B2 | 1/2004 | Phillips et al. |
| D494,435 S * | 8/2004 | Hayakawa ........ D8/68 |
| 6,776,150 B2 | 8/2004 | Gaidjiergis et al. |
| D505,852 S * | 6/2005 | Kuroyanagi ...... D8/69 |
| D506,653 S | 6/2005 | Elsworthy |
| 6,913,087 B1 | 7/2005 | Brotto et al. |
| 6,921,285 B2 | 7/2005 | Glauning |
| D507,953 S * | 8/2005 | Watson ............. D8/69 |
| 6,928,902 B1 | 8/2005 | Eyssallenne |
| 6,935,438 B2 | 8/2005 | Hofmann et al. |
| 6,983,809 B2 | 1/2006 | Leitenberger et al. |
| 6,996,909 B1 | 2/2006 | Buck et al. |
| 7,005,831 B2 | 2/2006 | Watson et al. |
| 7,024,966 B2 | 4/2006 | Chao |
| 7,063,171 B2 | 6/2006 | Totsu |
| D524,134 S * | 7/2006 | Wu .................. D8/68 |
| D525,847 S * | 8/2006 | Feldmann ......... B25F 5/02 |
| | | D8/68 |
| D527,966 S | 9/2006 | Hayakawa et al. |
| D528,382 S | 9/2006 | Baskar et al. |
| 7,100,373 B2 | 9/2006 | Oide |
| 7,111,364 B2 | 9/2006 | Bader et al. |
| D536,585 S | 2/2007 | Baskar et al. |
| D539,109 S * | 3/2007 | Aglassinger ...... D8/68 |
| D539,627 S * | 4/2007 | Watson ............. D8/69 |
| 7,204,026 B2 | 4/2007 | Phillips et al. |
| 7,248,019 B2 | 7/2007 | Ookubo et al. |
| 7,251,896 B2 | 8/2007 | Khubani |
| 7,291,061 B2 | 11/2007 | Kiss |
| 7,291,062 B2 | 11/2007 | Kiss et al. |
| D558,551 S * | 1/2008 | Okuda .............. D8/69 |
| D559,647 S * | 1/2008 | Watson ............. D8/69 |
| 7,370,423 B1 | 5/2008 | Huang |
| 7,464,473 B2 | 12/2008 | Fladgard et al. |
| D591,128 S * | 4/2009 | Chuan .............. D8/68 |
| 7,540,093 B1 | 6/2009 | Yeh |
| 7,581,319 B1 | 9/2009 | Little et al. |
| 7,752,760 B2 | 7/2010 | Baskar et al. |
| D628,037 S * | 11/2010 | Klingbeil ......... D8/68 |
| 7,930,833 B2 | 4/2011 | Baskar et al. |
| 7,971,360 B2 | 7/2011 | Clark et al. |
| 8,079,151 B2 | 12/2011 | Chen |
| 8,122,607 B2 | 2/2012 | Maniwa et al. |
| 8,136,257 B2 | 3/2012 | Lau |
| 8,266,991 B2 | 9/2012 | Thorson et al. |
| D676,731 S * | 2/2013 | Aglassinger ...... D8/69 |
| 8,567,521 B2 | 10/2013 | Lau |
| 8,579,043 B2 * | 11/2013 | Hirayama ......... B25F 5/02 |
| | | 173/109 |
| 8,677,627 B2 | 3/2014 | Li et al. |
| 8,683,704 B2 | 4/2014 | Scott et al. |
| 8,763,257 B2 | 7/2014 | Thorson et al. |
| 8,793,886 B2 | 8/2014 | Yamaoka et al. |
| D739,200 S * | 9/2015 | Elder ............... D8/68 |
| 9,434,013 B2 | 9/2016 | Johnson et al. |
| D788,559 S * | 6/2017 | Aglassinger ...... D8/68 |
| 9,764,486 B2 * | 9/2017 | Bublitz ............. B23D 29/005 |
| D823,088 S * | 7/2018 | Lefavour .......... D8/68 |
| D826,669 S * | 8/2018 | Kosugi ............. D8/68 |
| D835,963 S * | 12/2018 | Barezzani ........ D8/68 |
| 2003/0015066 A1 | 1/2003 | Chao |
| 2003/0102844 A1 | 6/2003 | Bailey |
| 2003/0136003 A1 | 7/2003 | Casttelmani |
| 2004/0088817 A1 | 5/2004 | Cochran et al. |
| 2004/0118257 A1 | 6/2004 | Kratzmaier |
| 2005/0073282 A1 | 4/2005 | Carrier et al. |
| 2005/0077878 A1 | 4/2005 | Carrier et al. |

(56) References Cited

U.S. PATENT DOCUMENTS

| | | |
|---|---|---|
| 2005/0115081 A1 | 6/2005 | Tu |
| 2006/0071643 A1 | 4/2006 | Carrier et al. |
| 2006/0108981 A1 | 5/2006 | Watson et al. |
| 2006/0151189 A1 | 7/2006 | Wu |
| 2006/0220605 A1 | 10/2006 | Funabashi et al. |
| 2006/0220612 A1 | 10/2006 | Feldmann et al. |
| 2007/0193761 A1 | 8/2007 | Brotto |
| 2007/0240892 A1 | 10/2007 | Brotto et al. |
| 2008/0222898 A1 | 9/2008 | Staples |
| 2008/0229591 A1 | 9/2008 | Saegesser et al. |
| 2008/0284373 A1 | 11/2008 | Watson et al. |
| 2008/0295340 A1 | 12/2008 | Carlucci et al. |
| 2008/0301948 A1 | 12/2008 | Kostner et al. |
| 2009/0271991 A1 | 11/2009 | Clark et al. |
| 2010/0037469 A1 | 2/2010 | Chubb |
| 2011/0209888 A1 | 9/2011 | Elsworthy |
| 2013/0219725 A1 | 8/2013 | Winkel et al. |
| 2013/0283985 A1 | 10/2013 | Vangura |
| 2014/0007433 A1 | 1/2014 | Kochi et al. |
| 2016/0023289 A1 | 1/2016 | Moss et al. |

FOREIGN PATENT DOCUMENTS

| | | |
|---|---|---|
| CN | 2900106 Y | 5/2007 |
| EP | 1973181 | 9/2008 |
| FR | 2947201 | 12/2010 |
| JP | 2001143678 | 5/2001 |
| JP | 2001351592 | 12/2001 |
| JP | 2002260619 | 9/2002 |
| WO | 8903171 A1 | 4/1989 |
| WO | WO2006052825 | 5/2006 |

OTHER PUBLICATIONS

Ryobi One+ 4.5" Angle Grinder, Model P420, Available Online at: <http://www.homedepot.com/webapp/wcs/stores/servlet/ProductDisplay?sto-reId=10051&langId=-1&catalogId=10053&productId=100519983&N=10000003+90401+-527282>, Available at least as early as Feb. 8, 2008.

Makita 18V LXT Lithium-Ion Cordless 41/2" Cut-Off/Angle Grinder (Tool Only), Model BGA452Z, Available Online at: <http://www.homedepot.com/webapp/wcs/stores/servlet/ProductDisplay?sto-reId=10051&langId=-1&catalogId=10053&productId=100487082&N=10000003+90401+-527282>, Available at least as early as Feb. 8, 2008.

International Search Report and Written Opinion for Application No. PCT/CN2013/081368 dated Jan. 9, 2014 (12 pages).

Chinese Patent Office Action for Application No. 201810482113.8, dated Apr. 1, 2019, 8 pages.

* cited by examiner

POWER TOOL, SUCH AS A METAL SHEARS

CROSS-REFERENCE TO RELATED APPLICATIONS

This application is a divisional of U.S. patent application Ser. No. 14/781,689, filed Oct. 1, 2015, now U.S. Pat. No. 9,764,486, which is a national stage entry of International Application No. PCT/CN2013/081368, filed Aug. 13, 2013, which claims priority to U.S. Provisional Patent Application No. 61/808,342, filed Apr. 4, 2013, the entire contents of all of which are incorporated by reference herein.

BACKGROUND

The present invention relates to power tools and, more particularly, to metal shears.

Metal shears are typically used to cut through sheet metal. Some metal shears include electrically-powered motors that drive shear heads to cut through metal. Such metal shears, however, may be bulky and difficult to manipulate and operate in constrained areas. In addition, due to the weight of the shear head, the metal shears may be cumbersome to hold and operate over an extended period of time.

SUMMARY

In one embodiment, the invention provides a power tool including a housing, a motor positioned within the housing, a drive mechanism coupled to the motor and positioned within the housing, and a shear head rotatably mounted to the housing and coupled to the drive mechanism. The power tool also includes a manually-operable actuator supported by the housing. The actuator is movable between a first position, in which the shear head is held stationary relative to the housing, and a second position, in which the shear head is rotatable relative to the housing.

In another embodiment, the invention provides a power tool including a housing having a first portion that defines a forward end of the housing, a second portion that defines a rearward end of the housing, an upper surface that extends rearwardly from the forward end, and a lower surface that extends forwardly from the rearward end. The power tool also includes a motor positioned within the housing, a drive mechanism coupled to the motor and positioned within the housing, an output element coupled to the drive mechanism at the forward end of the housing, a battery pack supported at the rearward end of the housing and electrically coupled to the motor, and an actuator operable to selectively power the motor to drive the drive mechanism and the output element. The actuator is supported by the housing forward of and above the battery pack.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

DETAILED DESCRIPTION

Figure 1:
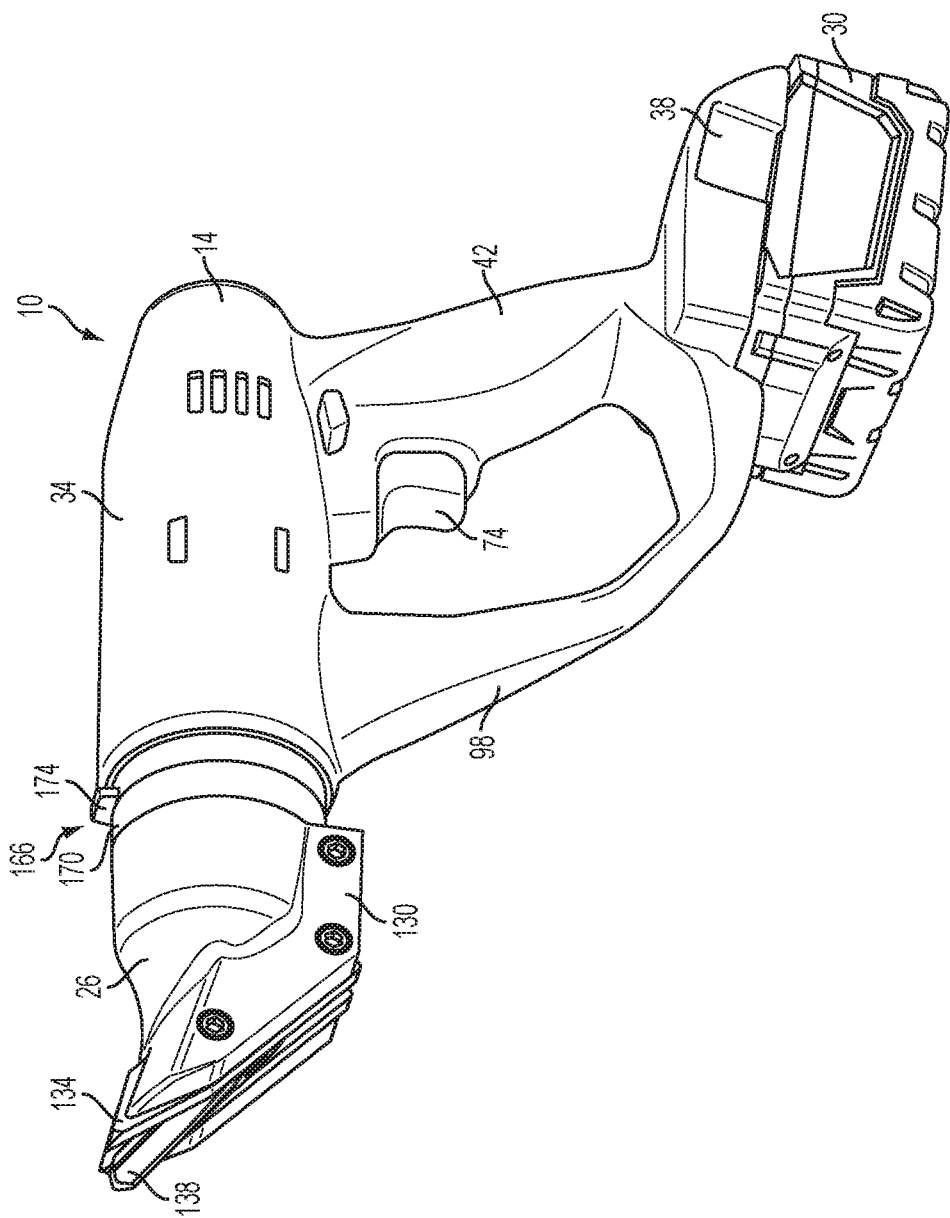
FIG. 1 is a perspective view of a power tool including a shear head in a first rotational position.

FIG. 1 illustrates a power tool 10 according to one embodiment of the invention. The illustrated power tool 10 is a metal shears. In other embodiments, the power tool 10 may be another type of tool, such as a drill, a screwdriver, a reciprocating saw, a pipe cutter, a nipper, a grinder, an impact wrench, or the like.

The power tool 10 includes a housing 14, a motor 18 (FIG. 3) positioned within the housing 14, a drive mechanism 22 (FIG. 3) coupled to the motor 18 and positioned within the housing 14, and an output element 26 coupled to and driven by the drive mechanism 22. The output element 26 is rotatably mounted on the housing 14 for performing a function. In the illustrated embodiment, the output element 26 is a shear head for cutting, for example, sheet metal. In other embodiments, the output element 26 may be another type of tool element (e.g., a drill or screwdriver chuck, a reciprocating saw spindle, a pipe cutting head, a nipper head, a grinder head, etc.) capable of performing a different power tool function.

In some embodiments, such as the illustrated embodiment, the power tool 10 also includes a battery pack 30 to power the motor 18 and, thereby, drive the drive mechanism 22 and the shear head 26. The illustrated battery pack 30 is a slide-on style, 18-volt Li-ion power tool battery pack. In other embodiments, the battery pack 30 may be a tower style battery pack that is insertable at least partially into the housing 14. Additionally or alternatively, the battery pack 30 may have other suitable voltages (e.g., 12 volts, 14.4 volts, 28 volts, etc.) and/or chemistries (e.g., NiMH, NiCd, etc.). In still further embodiments, the power tool 10 may be a corded power tool.

Figure 2:
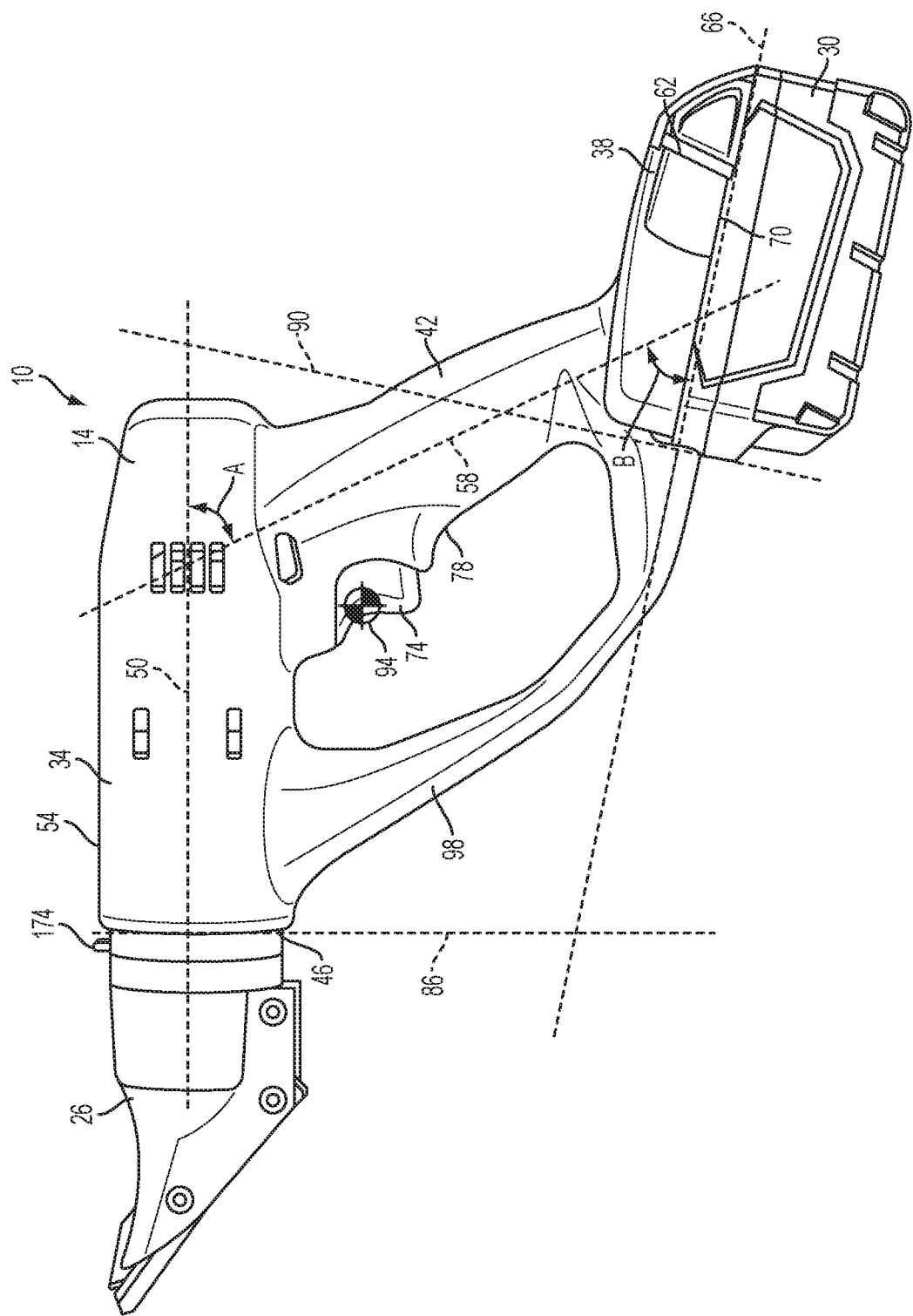
FIG. 2 is a side view of the power tool.

As shown in FIG. 2, the illustrated housing 14 includes a first or gear case portion 34, a second or battery support portion 38, and a third or grip portion 42. The gear case portion 34 houses the motor 18 and the drive mechanism 22 (FIG. 3) of the power tool 10. The gear case portion 34 also defines a forward end 46 of the housing 14 and has a first longitudinal axis 50. The first longitudinal axis 50 extends generally through a center of the gear case portion 34 and through the forward end 46 of the housing 14. The shear head 26 is mounted to the housing 14 at the forward end 46. An upper surface 54 of the housing 14 extends rearwardly (to the right in FIG. 2) from the forward end 46 along the gear case portion 34 and generally parallel to the first longitudinal axis 50.

Figure 3:
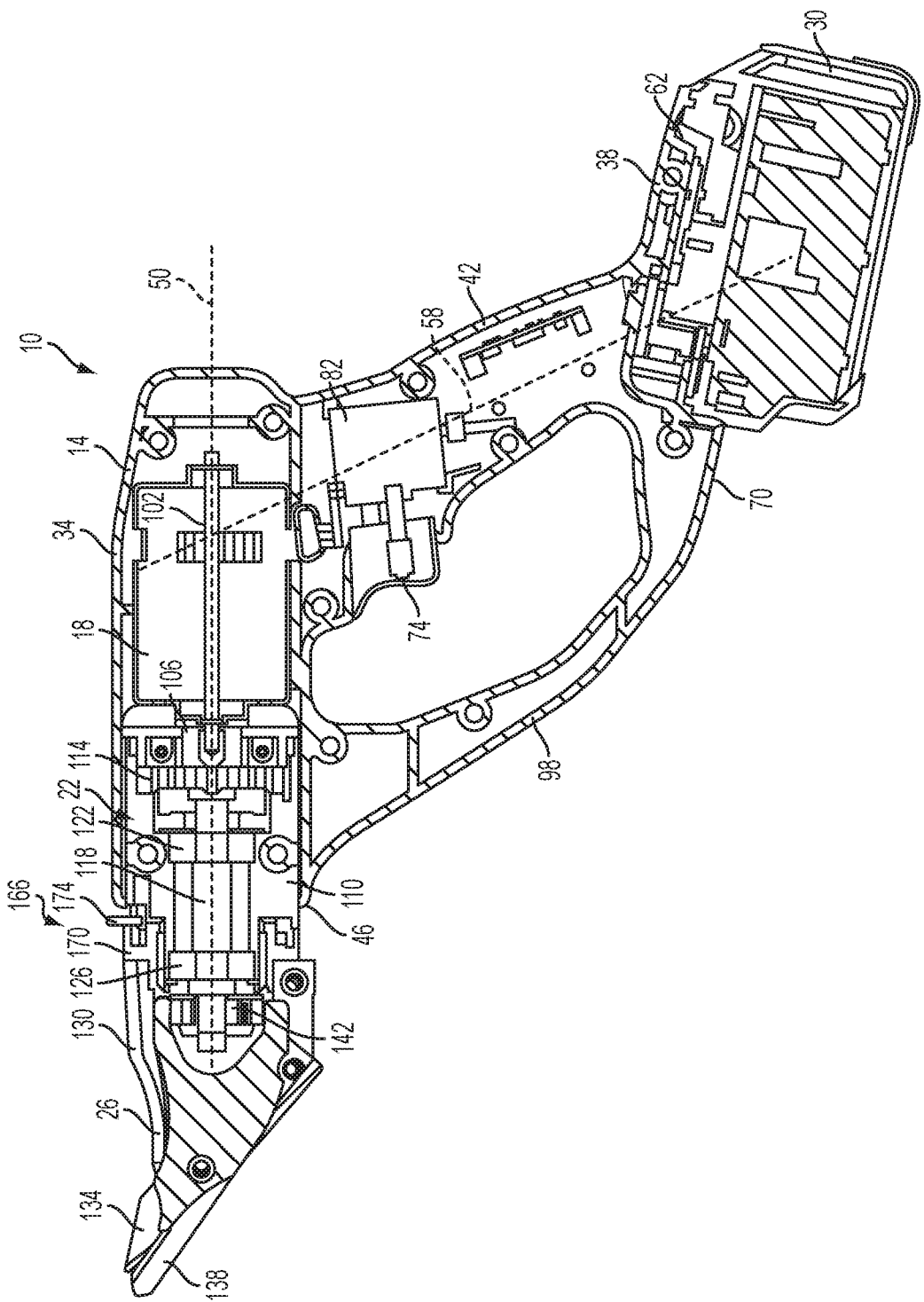
FIG. 3 is a cross-sectional view of the power tool.

The grip, or handle, portion 42 of the housing 14 extends from an end of the gear case portion 34 opposite from the forward end 46 of the housing 14. The grip portion 42 is configured to be grasped by a user when operating the power tool 10. The grip portion 42 has a second longitudinal axis 58 that extends generally through a center of the grip portion 42. The second longitudinal axis 58 is oriented at an oblique angle A relative to the first longitudinal axis 50 of the gear case portion 34. In some embodiments, the oblique angle A may be between about 45 degrees and about 70 degrees. In the illustrated embodiment, the oblique angle A is about 65 degrees. As shown in FIG. 3, the grip portion 42 is also configured and oriented such that the second longitudinal axis 58 extends through the motor 18 and the battery pack 30.

Referring back to FIG. 2, the battery support portion 38 extends from an end of the grip portion 42 opposite from the gear case portion 34. The battery support portion 38 receives the battery pack 30 to connect the battery pack 30 to the housing 14 and the motor 18. The battery support portion 38 defines a rearward end 62 of the housing 14 and has an insertion axis 66. The insertion axis 66 is the axis along which the battery pack 30 is slid to connect the battery pack 30 to (or remove the battery pack 30 from) the housing 14. A lower surface 70 of the housing 14 extends forwardly (to the left in FIG. 2) from the rearward end 62 along the battery support portion 38 and generally parallel to the insertion axis 66.

The illustrated battery support portion 38 is configured to receive a slide-on style battery pack, such as the battery pack 30 shown in the figures. The insertion axis 66 is oriented at an oblique angle B relative to the second longitudinal axis 58 of the grip portion 42 so that the battery pack 30 is slidable onto the battery support portion 38 in a direction from the rearward end 62 of the housing 14 toward the forward end 46 of the housing 14. In the illustrated embodiment, the oblique angle B is about 55 degrees so that the insertion axis 66 is also oriented at a relatively small acute angle relative to the first longitudinal axis 50 of the gear case portion 34. In other embodiments, the oblique angle B between the insertion axis 66 and the second longitudinal axis 58 may be the same as the oblique angle A between the first longitudinal axis 50 and the second longitudinal axis 58 so that the insertion axis 66 and the first longitudinal axis 50 are parallel.

In some embodiments, the battery support portion 38 may be configured to receive an insertable, tower style battery pack. In such embodiments, at least a portion of the battery pack may extend into the grip portion 42 when the battery pack is connected to the housing 14. In addition, the insertion axis 66 may be generally parallel to, or even coaxial with, the second longitudinal axis 58 of the grip portion 42.

The power tool 10 also includes an actuator 74 extending from the grip portion 42 of the housing 14. The actuator 74 extends outwardly from a forward edge 78 of the grip portion 42 (i.e., the edge of the grip portion 42 that is closest to the forward end 46 of the housing 14). In the illustrated embodiment, the actuator 74 is a trigger that is actuatable (e.g., depressible) by a user. In other embodiments, other suitable actuators may alternatively be employed. The actuator 74 is coupled to a switch 82 (FIG. 3) positioned within the grip portion 42. The switch 82 is electrically coupled to the motor 18 and the battery pack 30. When actuated, the actuator 74 actuates the switch 82 to power the motor 18.

The actuator 74 is supported by the grip portion 42 of the housing 14 forward of (to the left of in FIG. 2) and above the battery pack 30. That is, the actuator 74 is positioned closer to the forward end 46 of the housing 14 (in a direction parallel to the first longitudinal axis 50) and closer to the upper surface 54 of the housing 14 (in a direction perpendicular to the first longitudinal axis 50) than any portion of the battery pack 30. In addition, the actuator 74 is supported by the grip portion 42 rearward of (to the right of in FIG. 2) and below the output element 26. That is, the actuator 74 is positioned closer to the rearward end 62 of the housing 14 (in a direction parallel to the first longitudinal axis 50) and closer to the lower surface 70 of the housing 14 (in a direction perpendicular to the first longitudinal axis 50) than any portion of the output element 26. In some embodiments, a relatively small rearward portion (e.g., less than 10%) of the actuator 74 may overlap the forward-most edge or corner of the battery pack 30 in the direction parallel to the first longitudinal axis 50, yet still be considered forward of the battery pack 30.

As shown in FIG. 3, the actuator 74 is also positioned rearward of (in the direction parallel to the first longitudinal axis 50) and below the drive mechanism 22. In addition, the actuator 74 is positioned below the motor 18. As such, the motor 18 and the drive mechanism 22 are positioned forward of and above the battery pack 30. Furthermore, referring back to FIG. 2, the actuator 74 is positioned above the insertion axis 66 of the battery support portion 38. The actuator 74 is thereby located in an area bounded by a plane 86 defined by the forward end 46 of the housing 14, a plane 90 defined by a forward-most edge of the battery pack 30, the first longitudinal axis 50, and the insertion axis 66.

The arrangement of the grip portion 42 and the actuator 74 on the grip portion 42 increases the ergonomics of the power tool 10. In particular, the grip portion 42 allows a user to grasp and operate the power tool 10 while maintaining a neutral wrist angle. Furthermore, the position of the battery pack 30 relative to the output element 26, the drive mechanism 22, and the motor 18 helps balance the power tool 10 while being held by a user at the grip portion 42. A center of gravity 94 of the power tool 10 (when the battery pack 30 is connected to the housing 14) is located at or near the actuator 74 to reduce torque on a user's wrist during operation. Such a configuration reduces hand fatigue of the user.

As shown in FIGS. 1 and 2, the housing 14 further includes a hand guard portion 98. The hand guard portion 98 is positioned in front of the grip portion 42 (i.e., closer to the forward end 46 of the housing 14 than the grip portion 42) and extends directly from the gear case portion 34 to the battery support portion 38, bypassing the grip portion 42. The hand guard portion 98 is spaced apart from the grip portion 42 to help protect a user's hand from impacts during operation of the power tool 10. The hand guard portion 98 also inhibits the actuator 74 from being unintentionally actuated if the power tool 10 is dropped or bumped into another structure. In some embodiments, the hand guard portion 98 may be omitted.

As shown in FIG. 3, the motor 18 and the drive mechanism 22 are positioned within the gear case portion 34 of the housing 14. The motor 18 includes a motor shaft 102 and a motor pinion 106. The motor 18 is arranged within the housing 14 such that the shaft 102 is coaxial with the first longitudinal axis 50. The motor pinion 106 is coupled to an end of the shaft 102 and engages the drive mechanism 22. When powered by the battery pack 30 (by actuating the actuator 74 and the switch 82), the motor 18 rotates the motor shaft 102 and the pinion 106.

The drive mechanism 22 is coupled to the motor 18 to be driven by the motor 18. The components of the drive mechanism 22 are located within a gear box 110 of the housing 14. The illustrated drive mechanism 22 includes a planetary gear arrangement 114, an output shaft 118, and two bearings 122, 126. The planetary gear arrangement 114 engages the motor pinion 106 and the output shaft 118. The planetary gear arrangement 114 reduces the rotational output speed of the motor 18 to a desired rotational speed of the output shaft 118. Similar to the motor shaft 102, the output shaft 118 is coaxial with the first longitudinal axis 50 such that the motor 18 and the drive mechanism 22 are arranged in line within the gear case portion 34. The bearings 122, 126 are spaced apart from each other and support the output shaft 118 within the gear box 110.

The shear head 26 is mounted to the forward end 46 of the housing 14 and coupled to the drive mechanism 22. As shown in FIG. 5, the shear head 26 includes a body 130, two fixed blades 134, a movable blade 138, and a cam 142. The body 130 surrounds and supports the other components of the shear head 26. The fixed, or stationary, blades 134 are mounted to inner surfaces of the body 130 by bolts 146, 150. The movable blade 138 is positioned between the fixed blades 134. The movable blade 138 includes a generally C-shaped drive portion 154 that receives the cam 142. The cam 142 is mounted to an end portion of the output shaft 118 of the drive mechanism 22 and is circumferentially surrounded by two bearings 158, 162. The outermost bearing 162 engages an inner edge of the drive portion 154 of the movable blade 138 to drive the blade 138 during operation of the power tool 10.

Referring back to FIG. 3, when the motor 18 is energized by actuating the actuator 74, the motor shaft 102 rotates the motor pinion 106, which rotates the output shaft 118 through the planetary gear arrangement 114. The output shaft 118 rotates the cam 142. As the cam 142 rotates, the bearings 158, 162 press against the generally C-shaped drive portion 154 of the movable blade 138 to pivot the blade 134 about one of the bolts 146. The movable blade 138 thereby pivots relative to the fixed blades 134 to cut or shear materials (e.g., sheet metal).

As shown in FIGS. 4A-5B, the power tool 10 also includes a rotation mechanism 166 positioned between the housing 14 and the shear head 26. The rotation mechanism 166 is configured to allow the shear head 26 to be rotated relative to the housing 14. As such, the shear head 26 can be oriented at different angles relative to the housing 14 to facilitate holding and operating the power tool 10. In the illustrated embodiment, the rotation mechanism 166 allows the shear head 26 to rotate 360 degrees relative to the housing 14. In other embodiments, the rotation mechanism 166 may be configured to limit the extent of rotation of the shear head 26 relative to the housing 14.

The illustrated rotation mechanism 166 includes a support collar 170 and a manually-operable actuator 174. The support collar 170 is a generally cylindrical member having a nose portion 178 and an engagement portion 182. The support collar 170 also defines a central opening 186 extending through the nose and engagement portions 178, 182. The nose portion 178 extends into and is received in the body 130 of the shear head 26 to connect the support collar 170 to the shear head 26. The nose portion 178 is fixed to the body 130 of the shear head 26 such that the shear head 26 and the support collar 170 rotate together relative to the housing 14. A gasket 188, such as an O-ring, is positioned between the nose portion 178 and the shear head body 130.

Figure 5A:
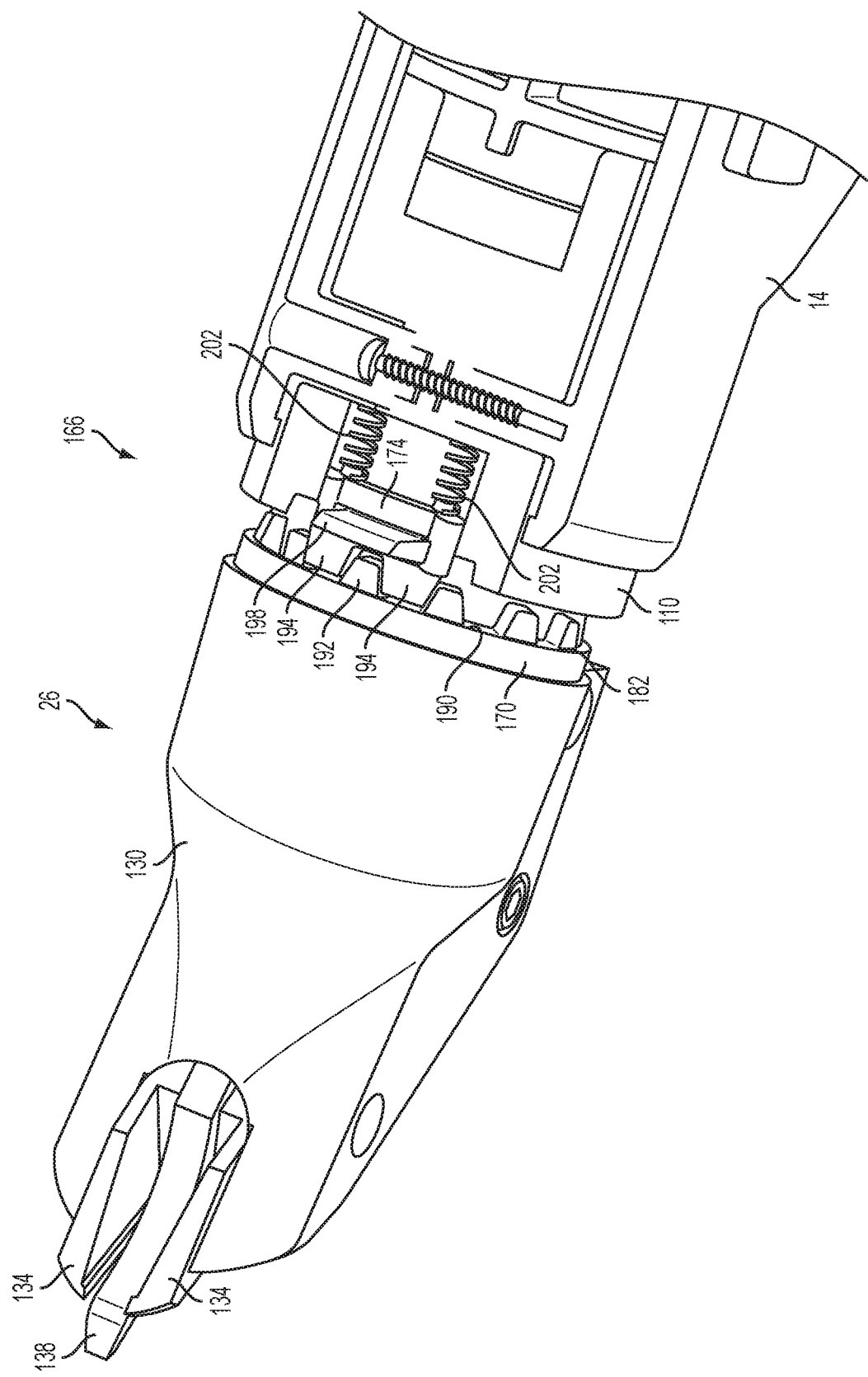
FIG. 5A is a top view of a portion of the power tool illustrating the actuator in the engaged position with the shear head.
Figure 5B:
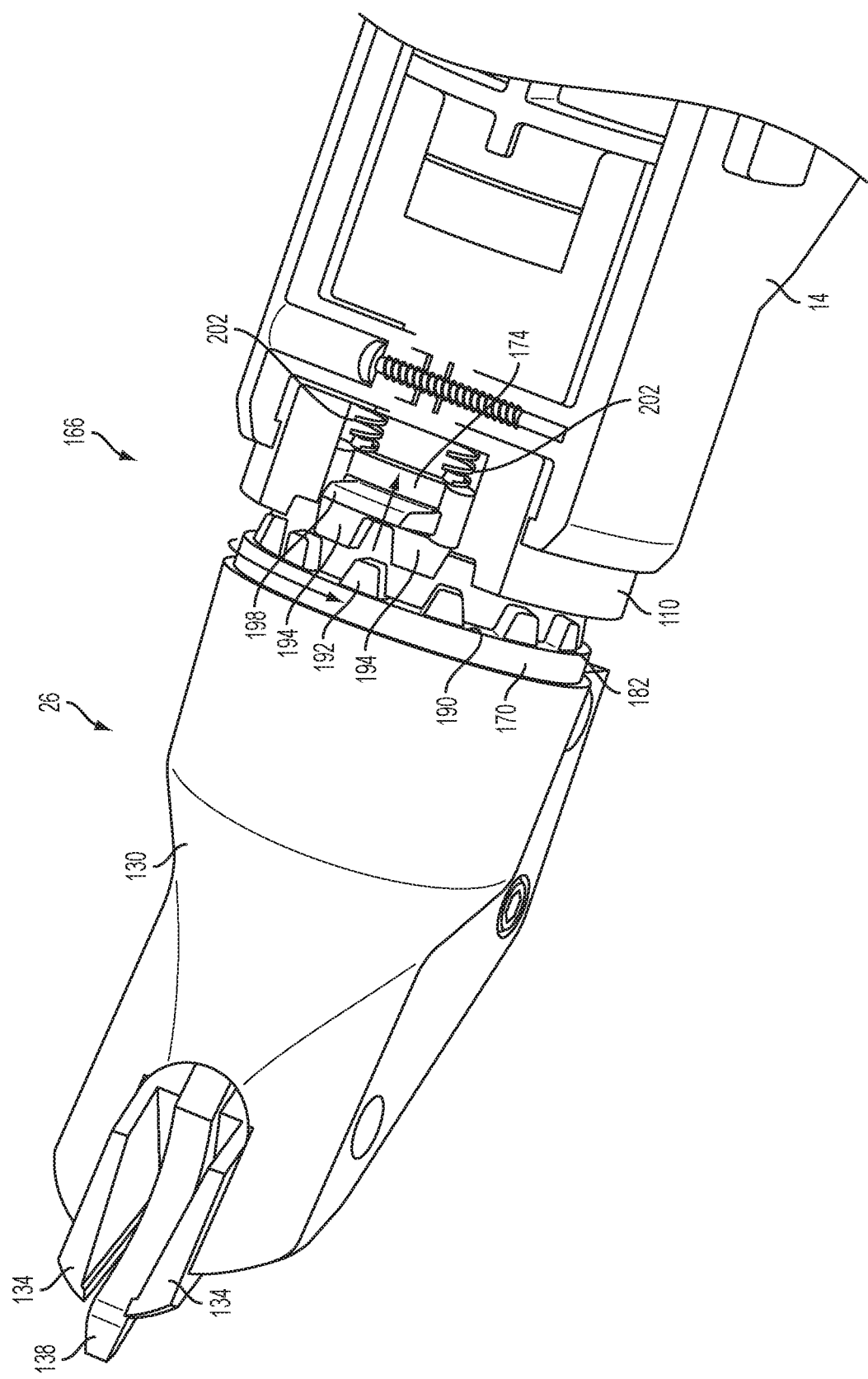
FIG. 5B is a top view of the portion of the power tool illustrated the actuator in the disengaged position with the shear head.
Figure 6:
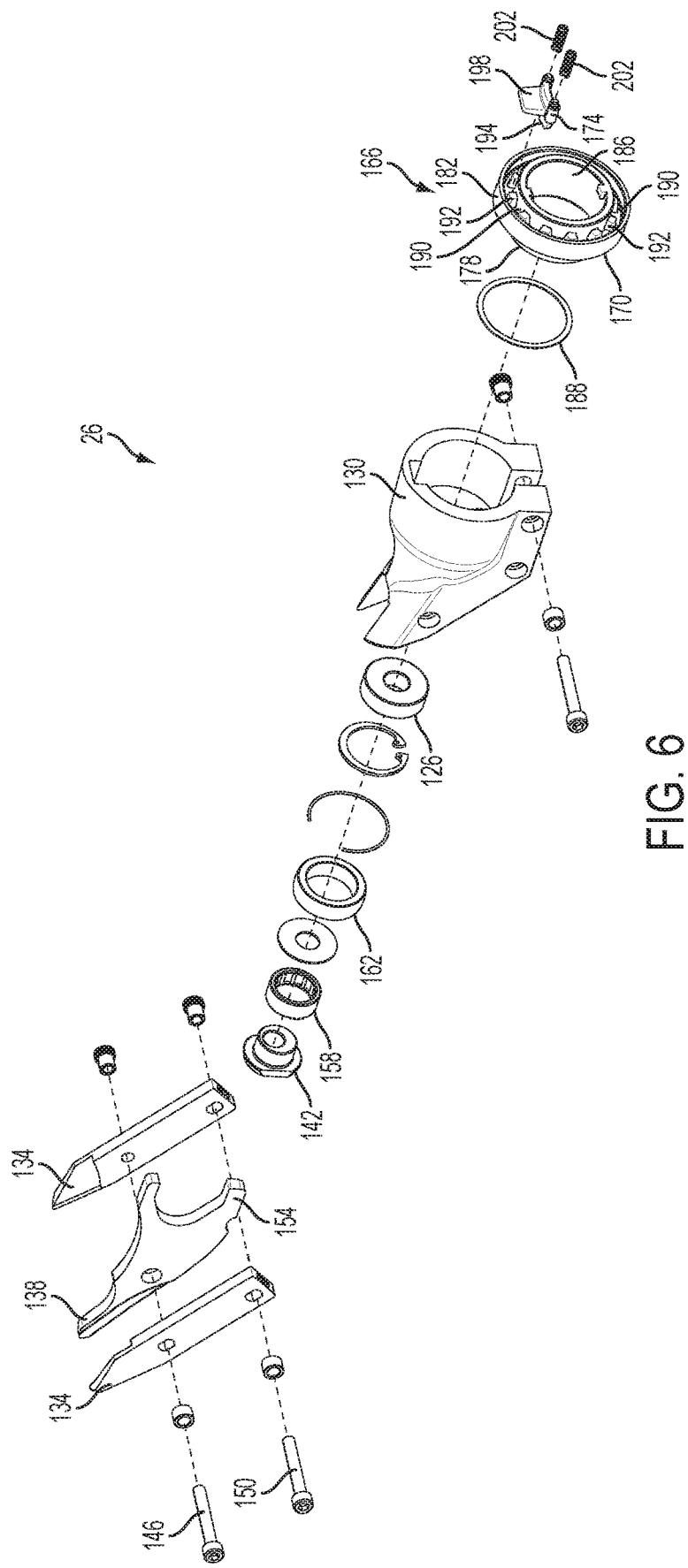
FIG. 6 is an exploded perspective view of the shear head of the power tool.

As shown in FIGS. 5A-6, the engagement portion 182 defines pockets or recesses 190. Each recess 190 is defined between two adjacent detents or teeth 192. The recesses 190 and the teeth 192 are circumferentially arranged and equally spaced around the support collar 170. Each of the recesses 190 defines a different, discrete rotational position of the shear head 26 relative to the housing 14. In the illustrated embodiment, the engagement portion 182 includes twelve recesses 190, which define twelve different rotational positions of the shear head 26. In other embodiments, the engagement portion 182 may include fewer or more recesses 190 and teeth 192 to define fewer or more rotational positions.

Referring back to FIGS. 4A and 4B, the central opening 186 of the support collar 170 receives a portion of the gear box 110 that extends from the forward end 46 of the housing 14 to connect the support collar 170 to the housing 14. As such, the drive mechanism 22 (particularly a portion of the output shaft 118 and one of the bearings 126) extends through the support collar 170 to engage and drive the shear head 26. The support collar 170 thereby surrounds a portion of the drive mechanism 22.

Figure 4A:
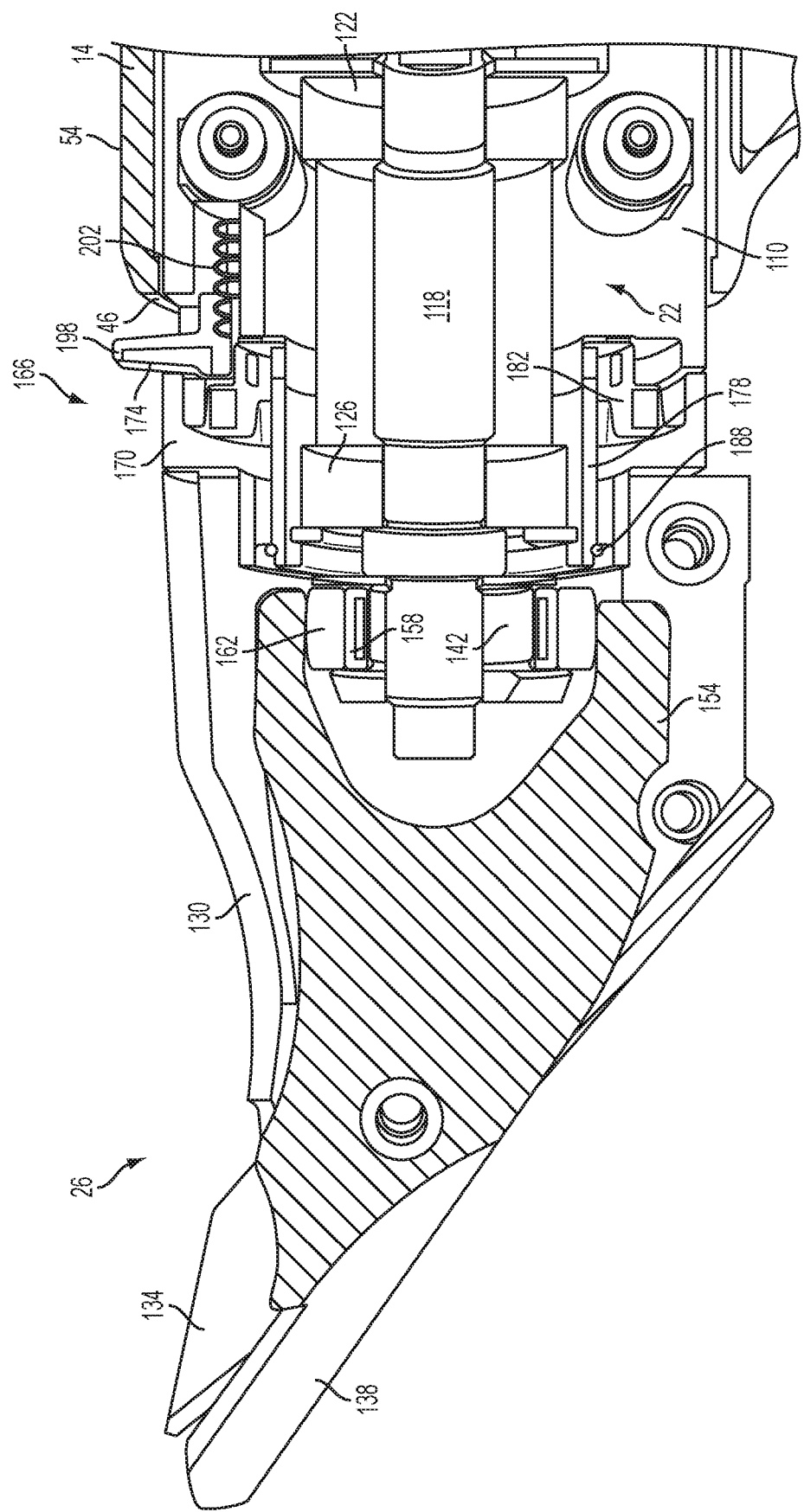
FIG. 4A is a cross-sectional view of the shear head of the power tool, the power tool including an actuator in an engaged position with the shear head.
Figure 4B:
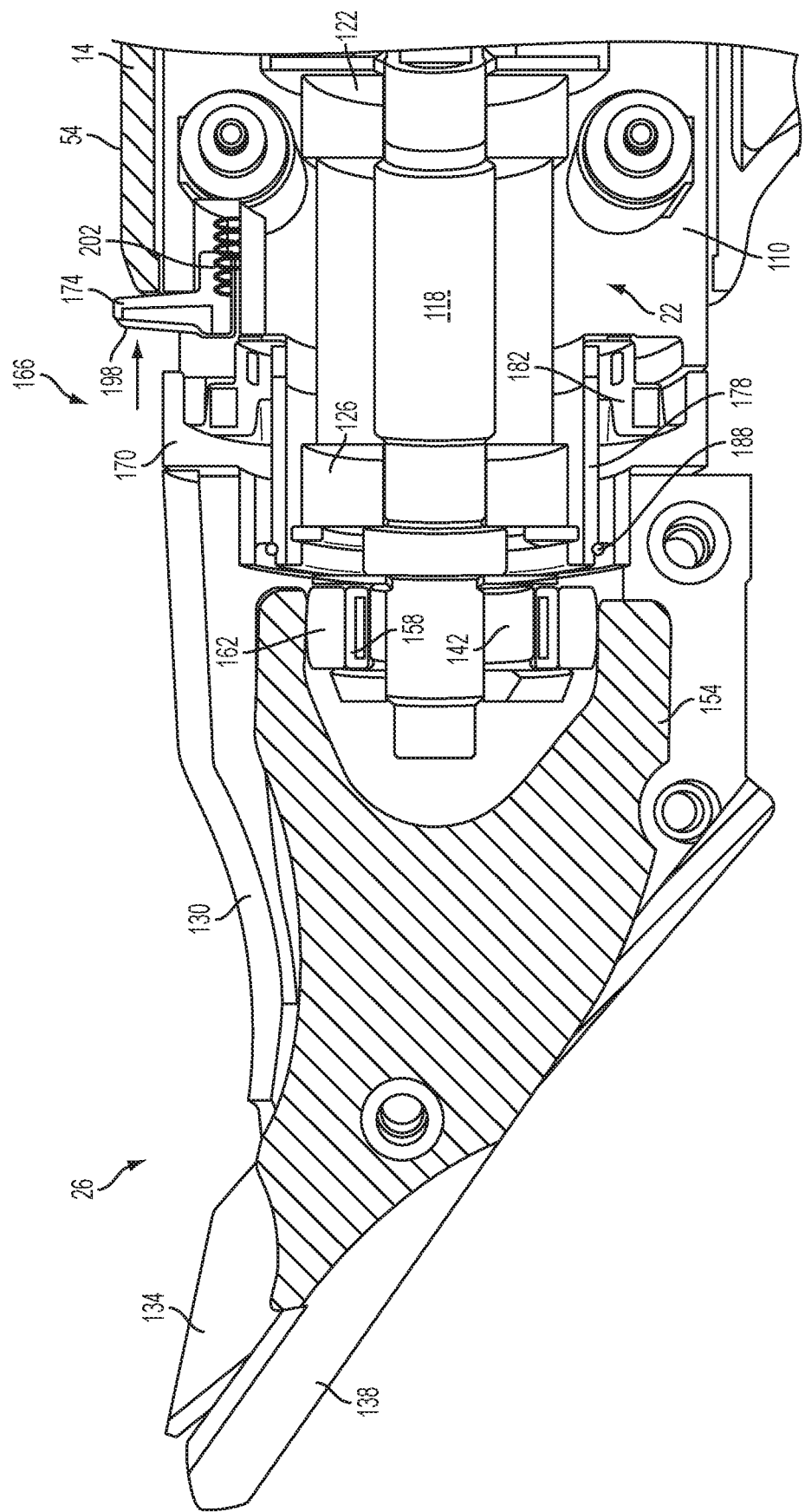
FIG. 4B is a cross-sectional view of the shear head of the power tool illustrating the actuator in a disengaged position with the shear head.

The manually-operable actuator 174, or swivel key, is supported by the housing 14 (and, more particularly, the gear box 110) and by the support collar 170. As shown in FIGS. 5A and 5B, the illustrated actuator 174 includes projections 194 and a lever portion 198. In the illustrated embodiment, the actuator 174 includes two projections 194, or detents, that are configured to fit within adjacent recesses 190 in the support collar 170 such that the projections 194 straddle one of the teeth 192. In other embodiments, the actuator 174 may include a single projection 194 that is received within one of the recesses 190. The lever portion 198 extends generally perpendicularly from the projections 194 and outwardly from the housing 14. The lever portion 198 is configured to be engaged by a user to move the actuator 174 relative to the housing 14. As shown in FIGS. 4A and 4B, the lever portion 198 extends from the upper surface 54 of the housing 14, but may alternatively extend from a different surface (e.g., a side surface) of the housing 14.

Figure 7:
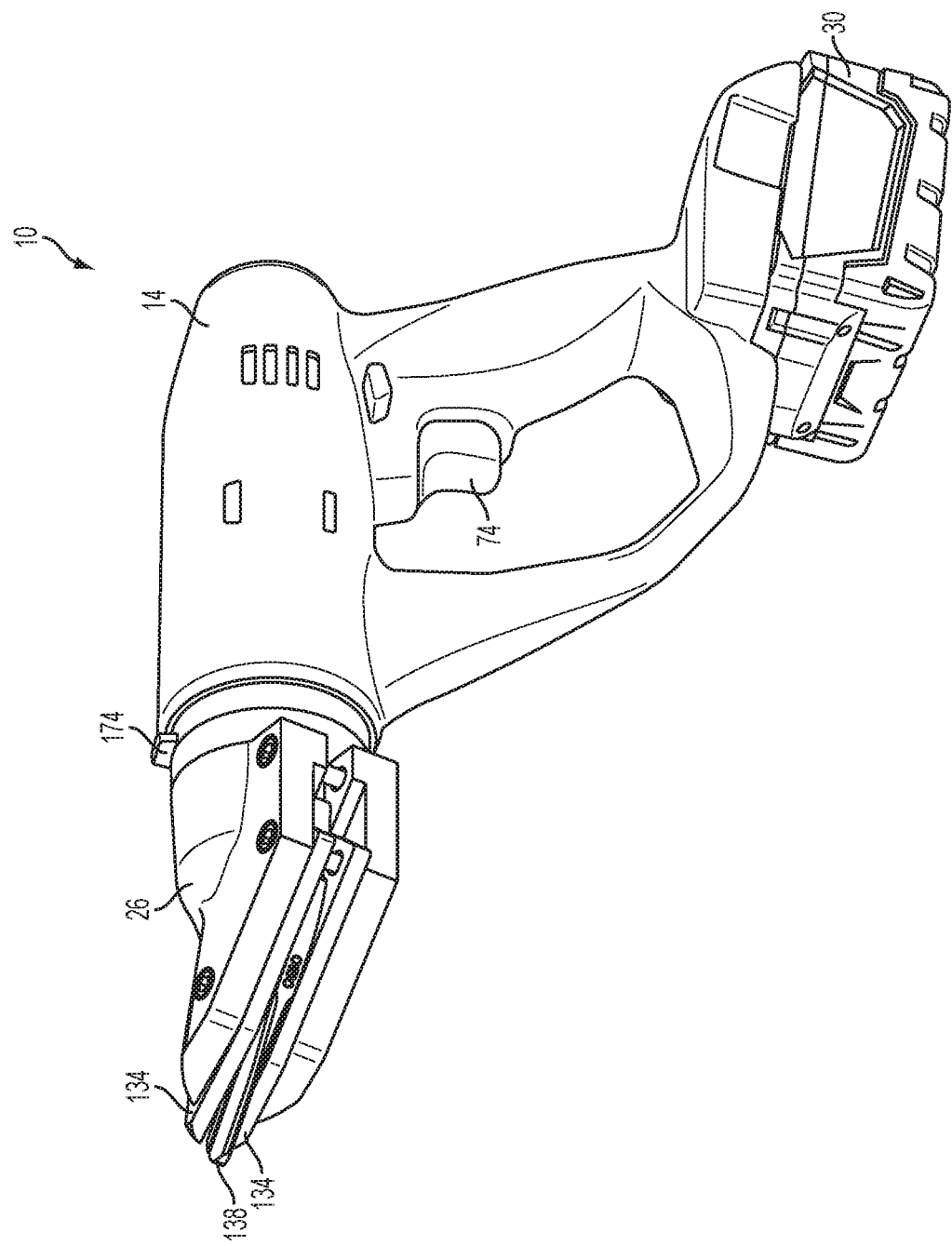
FIG. 7 is a perspective view of the power tool with the shear head rotated to a second rotational position.
Figure 8:
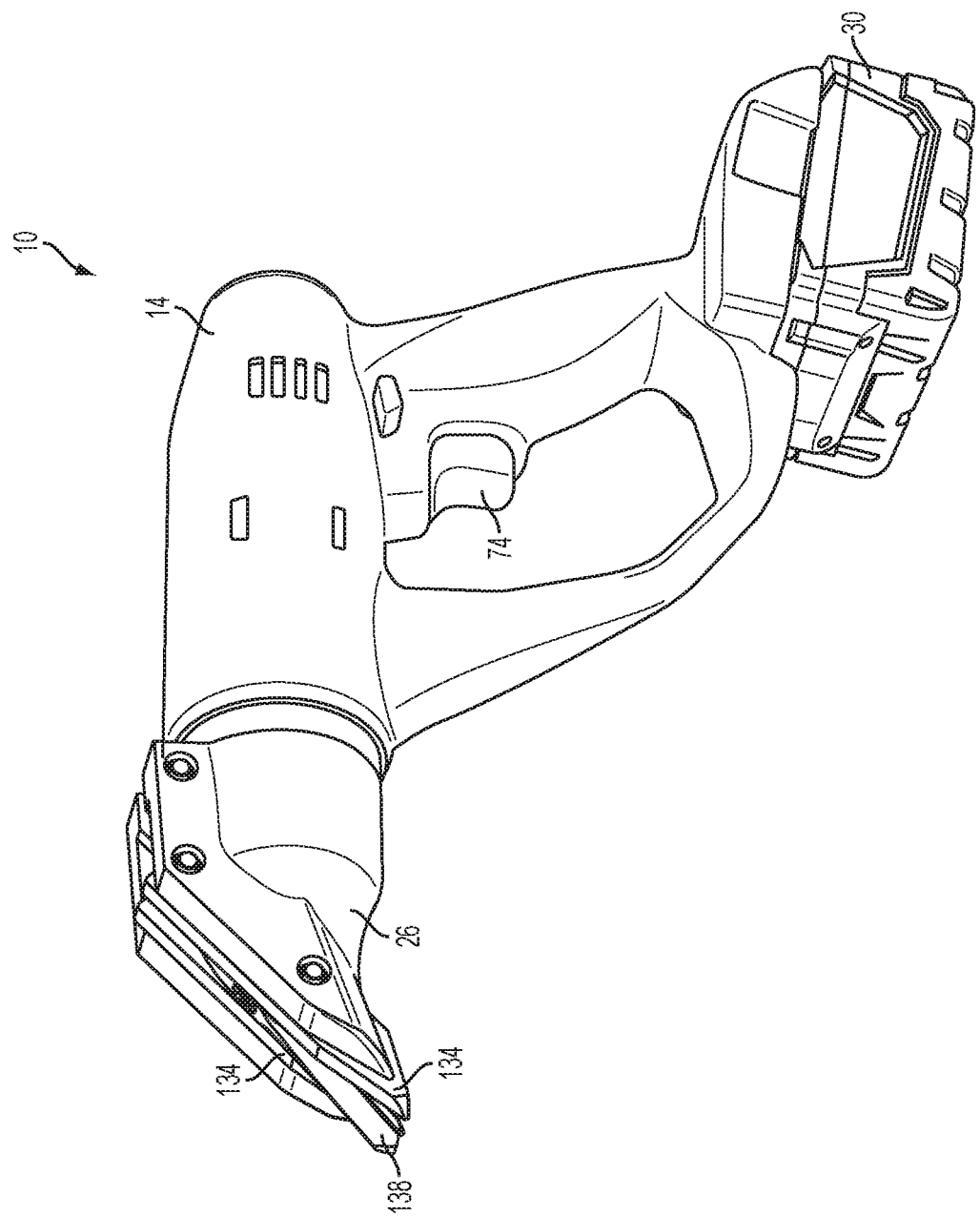
FIG. 8 is a perspective view of the power tool with the shear head rotated to a third rotational position.

The actuator 174 is movable relative to the housing 14 and the support collar 170 between a first, engaged position (FIGS. 4A and 5A) and a second, disengaged position (FIGS. 4B and 5B). In the first position, as shown in FIGS. 4A and 5A, the projections 194 of the actuator 174 fit within two of the recesses 190 of the support collar 170 to engage the support collar 170. As such, the actuator 174 holds the support collar 170, and thereby the shear head 26, stationary relative to the housing 14. In the second position, as shown in FIGS. 4B and 5B, the projections 194 of the actuator 174 are spaced apart from the recesses 190 of the support collar 170 to disengage the support collar 170. As such, the support collar 170 and the shear head 26 are rotatable relative to the housing 14. For example, the shear head 26 may be rotated relative to the housing 14 from a first rotational position (FIG. 1), to a second rotational position (FIG. 7), or to a third rotational position (FIG. 8). The shear head 26 rotates relative to the housing 14 between these rotational positions about a longitudinal axis of the output shaft 118, which is the same axis as the first longitudinal axis 50 (FIG. 3) of the gear case portion 34.

In the illustrated embodiment, the manually-operable actuator 174 is slidable relative to the housing 14 between the first and second positions. The actuator 174 is slidable in a direction that is generally parallel to the longitudinal axis about which the shear head rotates (i.e., the first longitudinal axis 50 of the gear case portion 34). In other embodiments, the actuator 174 may be moved relative to the housing 14 using different motions. By "manually-operable," the actuator 174 may be moved (e.g., slid) by a user between the first position and the second position without the use of tools (e.g., a screwdriver, hex wrench or key, etc.).

As shown in FIGS. 4A-6, the rotation mechanism 166 also includes two biasing members 202 positioned between the actuator 174 and the housing 14. The biasing members 202 bias the actuator 174 toward the first position (FIGS. 4A and 5A) to help hold the shear head 26 stationary relative to the housing 14. In the illustrated embodiment, each of the biasing members 202 is a coil spring. In other embodiments, other suitable biasing members may also or alternatively be employed. In some embodiments, the rotation mechanism 166 may only include a single biasing member.

In operation, the projections 194 of the actuator 174 fit within two adjacent recesses 190 of the support collar 170, as shown in FIG. 5A, to hold the shear head 26 relative to the housing 14 and the gear case 110. The actuator 174 thereby inhibits the shear head 26 from rotating relative to the housing 14. If a user desires to change the rotational or angular position of the shear head 26 relative to the housing 14, the user slides the actuator 174 away from the shear head 26 and against the biasing forces of the biasing members 202, as shown in FIG. 5B. The actuator 174 thereby disengages the recesses 190 and the teeth 192 of the support collar 170 such that the shear head 26 can be rotated relative to the housing 14 and the gear case 110. For example, the shear head 26 can be rotated from the position shown in FIG. 1 to the position shown in FIG. 7, the position shown in FIG. 8, or any other rotational position that is defined by the recesses 190 and the teeth 192. When the shear head 26 is in the desired rotational position, the user releases the actuator 174 such that the biasing members 202 bias the actuator 174 back toward the shear head 26. The projections 194 of the actuator 174 then slide back into two corresponding recesses 190 of the support collar 170 to hold the shear head 26 relative to the housing 14. As such, the illustrated rotation mechanism 166 provides a tool-less mechanism for rotating the shear head 26 relative to the housing 14.

In some embodiments, the support collar 170 may include projections formed on the engagement portion 182, and the actuator 174 may define one or more recesses configured to receive each of the projections. In such embodiments, the shear head 26 may be held stationary relative to the housing 14 when one of the projections of the support collar 170 fits within the recess in the actuator 174, and may be rotatable relative to the housing 14 when the actuator 174 is moved so that the recess disengages the projection.

Although the invention has been described with reference to certain preferred embodiments, variations and modifications exist within the scope and spirit of one or more independent aspects of the invention. Various features and advantages of the invention are set forth in the following claims.

What is claimed is:

1. A power tool when in an upright orientation comprising:
   a housing including a motor housing portion, a battery support portion, and a handle portion, an upward direction defined by a longitudinal axis of the handle portion toward the motor housing portion;
   a motor positioned within the motor housing portion;
   a drive mechanism coupled to the motor and positioned within the motor housing portion;
   an output element on the housing and coupled to the drive mechanism, the drive mechanism transferring torque from the motor to the output element in a forward direction;
   a battery pack supported by the battery support portion and electrically coupled to the motor, the battery pack including a forward-most edge in the forward direction, the forward-most edge defining a plane, the plane spaced from the motor housing portion; and
   an actuator operable to selectively power the motor to drive the drive mechanism and the output element, the actuator supported by the handle portion forward of the plane in the forward direction and above the battery pack in the upward direction.

2. The power tool of claim 1, wherein the longitudinal axis of the handle portion is a first longitudinal axis, wherein the motor housing portion of the housing has a second longitudinal axis, and wherein the second longitudinal axis is oriented at an oblique angle relative to the first longitudinal axis.

3. The power tool of claim 1, wherein the actuator is supported by the handle portion beneath the motor in a downward direction opposite the upward direction.

4. The power tool of claim 1, wherein the motor and the drive mechanism are positioned forward of the battery pack in the forward direction and above the battery pack in the upward direction.

5. The power tool of claim 1, wherein the battery pack is connectable to the battery support portion of the housing along an insertion axis, and wherein the actuator is located above the insertion axis in the upward direction.

6. The power tool of claim 1, wherein the power tool has a center of gravity, and wherein the center of gravity is located at the actuator.

7. The power tool of claim 1, wherein the battery support portion includes a surface interfacing with the battery pack while the battery pack is coupled to the battery support portion, and wherein the surface is oriented transverse to the plane.

* * * * *